US010572279B2

(12) United States Patent
Chinnathambi et al.

(10) Patent No.: US 10,572,279 B2
(45) Date of Patent: Feb. 25, 2020

(54) CROSS-PROCESS INTERFACE FOR NON-COMPATIBLE FRAMEWORKS

(71) Applicant: Microsoft Technology Licensing, LLC, Redmond, WA (US)

(72) Inventors: Kirupa Chinnathambi, Redmond, WA (US); Kiril Nikolov Seksenov, Seattle, WA (US); Bradley James Peters, Kirkland, WA (US); John-David Lewis Dalton, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2 days.

(21) Appl. No.: 15/950,105

(22) Filed: Apr. 10, 2018

(65) Prior Publication Data

US 2019/0310866 A1    Oct. 10, 2019

(51) Int. Cl.
*G06F 17/50* (2006.01)
*G06F 9/451* (2018.01)
*G06F 8/76* (2018.01)
*G06F 8/38* (2018.01)
*G06F 9/54* (2006.01)

(52) U.S. Cl.
CPC ............. *G06F 9/451* (2018.02); *G06F 8/38* (2013.01); *G06F 8/76* (2013.01); *G06F 9/541* (2013.01)

(58) Field of Classification Search
CPC .. G06F 17/5009; G06F 13/102; G06F 16/116; G06F 8/34; G06F 13/00; G06F 17/28; G06F 8/38
See application file for complete search history.

(56) References Cited

U.S. PATENT DOCUMENTS

| 9,395,826 B1* | 7/2016 | Cronin ............... G06F 3/03547 |
| 2009/0144757 A1 | 6/2009 | Stall |
| 2011/0047594 A1* | 2/2011 | Mahaffey ............. G06F 21/564 726/1 |

(Continued)

OTHER PUBLICATIONS

"International Search Report and Written Opinion Issued in PCT Application No. PCT/US2019/024159", dated Jul. 2, 2019, 10 Pages.

*Primary Examiner* — Tuan C Dao
(74) *Attorney, Agent, or Firm* — Alleman Hall Creasman & Tuttle LLP

(57) ABSTRACT

A computer device is provided that includes a processor configured to execute a first application configured for a first user interface framework, instantiate a host window of the first application using the first user interface framework, and execute a second application, that is out of process with the first application. The second application is configured for a second user interface framework that is incompatible with the first user interface framework. The processor is further configured to instantiate a hosted window of the second application using the second user interface framework, establish a cross-process interface between the first application and the second application configured to exchange rendering information between the hosted window and the host window, and cause the host window to display the rendering information from the hosted window within the host window on a display of the computer device.

20 Claims, 7 Drawing Sheets

(56) References Cited

U.S. PATENT DOCUMENTS

2012/0324338 A1* 12/2012 Meredith ................. G06F 8/60
  715/234
2013/0326474 A1* 12/2013 Lane ........................ G06F 8/30
  717/107
2016/0062807 A1*  3/2016 Reeves ................... G06F 13/14
  719/320
2016/0328577 A1* 11/2016 Howley ................. G06F 19/00
2018/0285554 A1* 10/2018 Biswas ................... G06F 21/44
2019/0102201 A1*  4/2019 Hu ........................... G06F 9/54

* cited by examiner

CROSS-PROCESS INTERFACE FOR NON-COMPATIBLE FRAMEWORKS

BACKGROUND

A large number of application programs have been built on and continue to be built on legacy technologies. However, these legacy technologies may become incompatible with modern technologies that provide improved functionality. To access the runtime improvements and functionality of these modern technologies, developers typically must rewrite their code base and build their application on the modern technology, which may be time consuming and expensive for these developers.

SUMMARY

A computer device is provided that may include a processor configured to execute a first application configured for a first user interface framework, instantiate a host window of the first application using the first user interface framework, and execute a second application, that is out of process with the first application. The second application is configured for a second user interface framework that is incompatible with the first user interface framework. The processor may be further configured to instantiate a hosted window of the second application using the second user interface framework, establish a cross-process interface between the first application and the second application configured to exchange rendering information between the hosted window and the host window, and cause the host window to display the rendering information from the hosted window within the host window on a display of the computer device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Many developers are building or have built their applications on legacy technologies. For example, these legacy applications may be built using legacy technologies such as WINDOWS API (Win32), WINDOWS Presentation Foundation, WINDOWS Forms, etc. However, it will be appreciated that these legacy applications may also be built using other legacy technologies and are not limited to WINDOWS specific technologies. Additionally, even though these legacy applications may be built using programming languages such as, for example, C #, Visual Basic, etc., they may also integrate legacy web content into the application to provide a user interface and other functionality using legacy web applications such as Internet Explorer (IE) 7, IE 11, etc., and legacy web code such as code written in Hypertext Markup Language (HTML) versions prior to HTML5, Javascript, etc.

The legacy web components of the legacy technologies that these legacy applications are built on are typically tied to corresponding legacy web technologies. For example, the legacy web components of Win32, WINDOWS Presentation Foundation, WINDOWS Forms, etc., may be tied to IE 7, IE 11, etc. Consequently, these legacy applications may be unable to integrate web content that is built on a modern technology that is incompatible with the legacy technology. As a specific example, applications built on Win32 may be unable to natively integrate web content from modern web applications built on modern technologies such as Universal WINDOWS Platform (UWP) using modern web code such as HTML5.

To access the runtime improvements and functionality of these modern technologies, developers typically must rewrite their code base and build their application on the modern technology, which may potentially be time consuming and expensive for the developer. Additionally, it will be appreciated that these challenges are not limited to legacy vs modern technologies. Typically, an application built on a first user interface framework based on a first programming language may not be able to integrate content from another application built on a second user interface framework based on a second programming language that is incompatible with the first framework. For example, an application built using Java typically cannot integrate visuals and content from another application built using C #.

Figure 1:
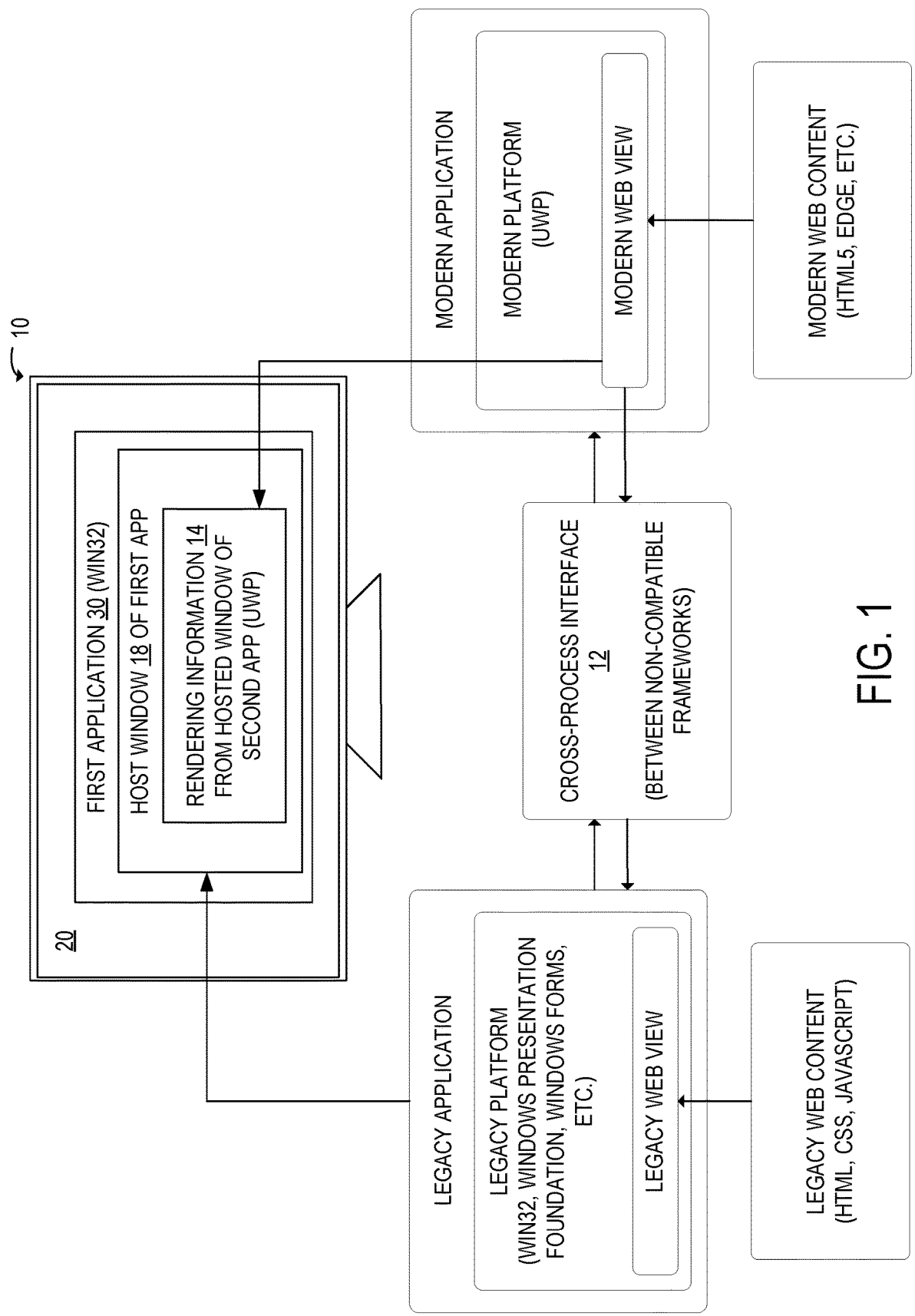
FIG. 1 shows an example computer device using a cross-process interface to provide visuals from a modern application within a window of a legacy application.

To address the challenges discussed above, a computer device 10, shown in the example embodiment of FIG. 1, is provided. As will be described in more detail below, the computer device 10 is configured to establish a cross-process interface 12 between two or more applications configured for non-compatible user interface frameworks. In the illustrated example, the cross-process interface 12 is configured to exchange rendering information 14 from a hosted window 16 of a second application built on UWP with a host window 18 of a first application built on Win32 to cause the host window 18 of the first application to display the rendering information 14 from the hosted window 16 of the second application within the host window 18 on a display 20 of the computer device 10. It will be appreciated that the cross-process interface 12 is not limited to UWP and Win32, but may also be established between other non-compatible frameworks via other implementations of the cross-process interface 12.

Figure 2:
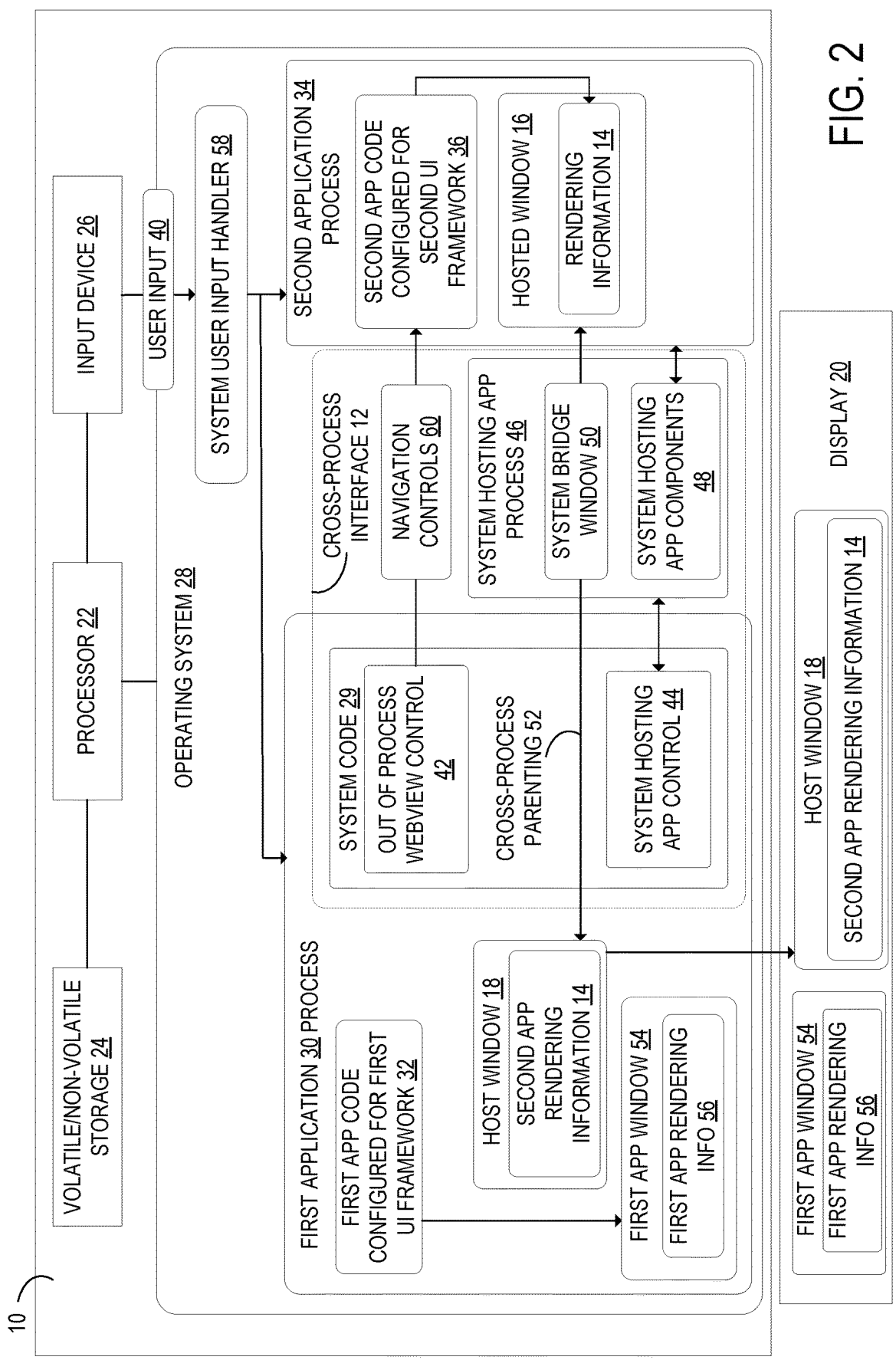
FIG. 2 shows a schematic view of the computer device of FIG. 1.

FIG. 2 illustrates a schematic view of the computer device 10. The computer device 10 includes a processor 22, volatile storage/non-volatile storage devices 24, an input device 26, the display 20, and other suitable computer components to implement the methods and processes described herein. The input device 26 may include, for example, one or more of a mouse, a touchscreen, a trackpad, a keyboard, a camera, a microphone, and/or other input devices. The processor 22 is configured to execute an operating system 28 and instructions for applications stored on the volatile storage/non-volatile storage devices and/or retrieved from a server device via a network.

As illustrated in FIG. 1, the processor 22 is further configured to execute a first application 30 configured for a first user interface framework 32. The first application 30 is configured to integrate content, such as a user interface or other functionality, from a second application 34 configured for a second user interface framework that is incompatible with the first user interface framework 32. In one specific example, the first application 30 may take the form of a legacy application built on a legacy technology such as Win32, and the second application 34 may take the form of a modern web application built on a modern technology such as UWP. For example, the first application 30 may take the form of a stand-alone executable such as MICROSOFT OFFICE or MICROSOFT EXCEL application for Win32, and the second application 34 may be a web-based add-in such as a currency calculator built on UWP. However, it will be appreciated that the first and second application 30 and 34 may take other forms, and may be configured for other example incompatible first and second user interface frameworks 32 and 36.

In one example, the second user interface framework 36 is incompatible with the first user interface framework 32 by having no native control in the first user interface framework 32 to host an application of the second user interface framework 36. That is, the first user interface framework 32 does not natively include a control, such as, for example, a webview controller/manager, that is configured to launch and manage a webview for an application configured for the second user interface framework 36 to present rendering information 14 and other functionality (e.g. user interface) of the second application 34 within the first application 30.

In another example, the first user interface framework 32 is based on a first programming language and the second user interface framework 36 is based on a second programming language, the first programming language being incompatible with the second programming language. For example, the first application 30 may be configured for a user interface framework built on Java and the second application may be configured for a user interface framework built on C #, which are incompatible programming languages. However, it will be appreciated that the first and second programming languages may take the form of any suitable pair of incompatible programming languages.

While executing the first application 30, the processor 22 is configured to instantiate a host window 18 of the first application 30 using the first user interface framework 32. In one specific example, the instance of the host window 18 includes a handle (e.g. HWND) to the host window 18 that is recognized within the first user framework 32. However, it will be appreciated that other platforms/frameworks may use other handles to manage their windows. In one example, the host window 18 includes a size and location that may be initially set by the first application 30, and moved or resized via user input 40 to the input device 26.

As discussed above, the first user interface framework 32 may not include a native control for launching a webview of an application built on the second user interface framework 36. Thus, in one example, the operating system 28 includes system code for an out of process webview control 42 and a system hosting application control 44 that may be executed within the process of the first application 30. The out of processor webview control 42 and the system hosting application control 44 may include application programming interface (API) functions that are recognized by the first user interface framework 32.

After instantiating the host window 18, the processor 22 executing code for the first application 30 may be configured to being a process for establishing a cross-process interface 12 by activating an instance of the system hosting application control 44. The instance of the system hosting application control 44 may be configured to launch a system hosting application process 46 which is a system process configured to host and manage out of process webviews for applications built on the second user interface framework 36. The system hosting application control 44 and the system hosting application process 46 may be configured to launch and manage a plurality of webviews for one or more applications built on the second user interface framework 36. The system hosting application control 44 is a runtime class that the first application 30 process may use to manage the system hosting application program 46 and the one or more webview processes launched by the system hosting application program 46. In one example, the first application 30 may use properties of the system hosting application control 44 to size and position the one or more launched webviews for the second application 34, set a scale of the one or more webviews, setting programmatic focus and tabbing into/out of the one or more webviews, etc.

In one specific example, the system hosting application process 46 is a DirectX UWP application included in the operating system 28 being executed by the computer device 10 that is configured to host webviews for applications built on UWP. However, it will be appreciated that the system hosting application process 46 may be built on technologies other than UWP in other incompatible framework scenarios, such as Java and C #. The system hosting application process 46 includes system hosting application components 48 that may be configured to forward notifications from the system hosting application control 44, such as notifications for size, position, visibility, etc. of the webview, to the one or more launched webview processes for the second application 34 so that the one or more webview processes are may be correctly resized, repositioned, etc.

After launching a webview process for the second application 34, the processor 22 is further configured to execute the second application 34, that is out of process with the first application 30. As discussed previously, the second application 34 is configured for the second user interface 36 framework that is incompatible with the first user interface framework 32. The executed code for the second application 34 may include various functionality, user interfaces, visual content, etc., that may be provided to the first application 30 via the cross-process interface 12.

When launching the webview process for the second application 34, the processor 22 is further configured to instantiate a hosted window 16 of the second application 34 using the second user interface framework 36. Similarly to the host window 18, the hosted window 16 may also include a backing HWND. However, it will be appreciated that other frameworks and platforms may use different handles for windows.

The HWND for the hosted window 16 may be returned or otherwise sent to the instance of the system hosting application process 46. In the example illustrated in FIG. 2, the system hosting application process 46 may create an instance of a system bridge window 50 that is owned by the system. In one example, the system hosting application process 46 may be configured to establish a cross-process parenting 52 between the system bridge window 50 and the hosted window 16 using their corresponding backing HWNDs. The bridge window may be configured to act as a translation layer between the operating system 28 and the hosted window 16, such that the hosted windows 18 receives appropriate window messages and events from the system in the same manner as when the second application 34 is run in a non-hosted scenario.

Next, the processor 22 may be configured to call a SetParent function of the system hosting application control 44 within the first application 30 process that passes the backing HWND of the host window 18 to the system hosting application process 46, and causes the system hosting application process 46 to establish a cross-process parenting 52 between the host window 18 and the system bridge window 50 using the corresponding backing HWNDs. In this manner, the processor 22 is configured to establish a cross-process interface 12 between the host window 18 and the hosted window 16, configured to exchange rendering information 14 between the hosted window 16 and the host window 18. In the illustrated example, to establish the cross-process interface 12 the processor 22 is configured to establish the cross-process parenting 52 between the host window 18 and the hosted window 16, such as, for example, through the system bridge window 50 as described above. That is, the host window 18 may be established as a parent of the hosted window 16 through the cross-process parenting 52 methods described above, such that rendering information 14 generated when executing the code for the second application 34 and sent to the hosted window 16 is also exchanged with the parent host window 18.

Once the cross-process interface 12 between the host window 18 and the hosted window 16 has been established, the processor 22 is configured to cause the host window 18 to display the rendering information 14 from the hosted window 16 within the host window 18 on a display 20 of the computer device 10. In one example, the process for the first application 30 may be further configured to create a first application window 54 that is configured to present first application rendering information 56 that is rendered based on the code of the first application 30. Thus, the first application 30 being displayed view the display 20 may include both the first application window 54 and the host window 18, such that both the first application rendering information 56 and the second application rendering information 14 is displayed to the user of the computer device in a unified format such that the user perceives that only one application is running.

Figure 3:
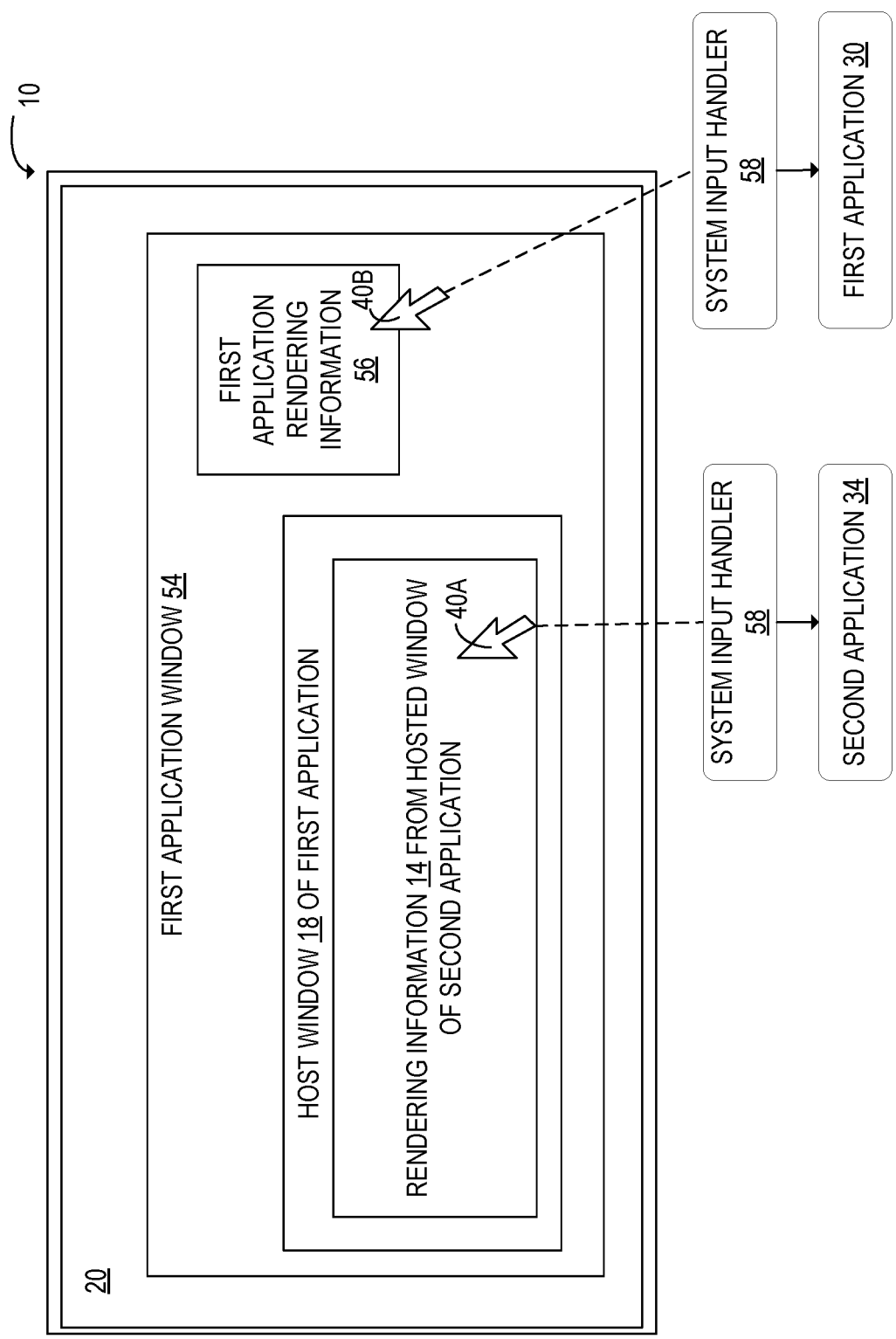
FIG. 3 shows an example first application including a host window being displayed using the computer device of FIG. 1.

In the example illustrated in FIG. 3, the display 20 may display the first application window 54 for the first application 30 being executed by the processor 22. The first application window 54 for the first application 30 may contain the first application rendering information 56 that was rendering according to the code of the first application 30. The first application window 54 may further contain the host window 18 at a designated location and with a designated size relative to the first application window 54. As discussed above, the designated size and location may be communicated to the hosted window 16 via the instance of the system hosting application control 44 within the process of the first application 30.

The rendering information 14 generated according to the code of the second application 34 may be exchanged between the hosted window 16 and the host window 18 via the established cross-process interface 12, and the rendering information 14 may be displayed in the host window 18 in the first application window 54 for the first application 30, such that a unified view of both the first application rendering information 56 and the second application rendering information 14 are presented to the user of the computer device 10 in a unified format.

As illustrated in FIG. 3, the user may enter user input 40 to the computer device 10 via the input device 26, which, for example, make take the form of a mouse input device. Using the input device 26, the user may enter the user input 40 via clicking on particular locations of the display 20. The user input 40 is processed by a system input handler 58, which may be configured to compare the locations of user inputs 40 with the known location of the host window 18 and the hosted window 16 to determine whether the user inputs 40 are directed to the hosted window 16. For example, the system input handler 58 of the operating system 28 may be configured to determine an area of the display associated with the hosted window 16, such as, for example, via the system bridge window 50 or the system hosting application process 46 owned by the operating system 28, and compare the determined area to the location of the user input 40. The system input handler 58 may be further configured to route user inputs 40 from the area of the display 20 associated with the hosted window 16 to the hosted window 16 directly. That is, the system input handler 58 may route user inputs 40 that are determined to be directed towards the hosted window 16 directly to the hosted window 16 without passing through the first application 30 and the host window 18. In the example illustrated in FIG. 3, the example user input 40A is located within the area of the display 20 associated with the hosted window 16, and is thus routed to the hosted window 16 and the second application 34 directly from the operating system 28. On the other hand, the example user input 40B is located outside of the area of the display 20 associated with the hosted window 16, and is thus routed to the first application 30 from the operating system 28.

Turning back to FIG. 2, after the system hosting application control 44, the system hosting application process 46, and the webview process for the second application 34 have been launched according to the processes discussed above, the system hosting application control 44 may be further configured to create the out of process webview control 42 configured to route navigation controls 60 from the first application 30 to the second application 34. As illustrated, the out of process webview control 42 of the cross-process interface 12 is included in the system code 29 being run within the process of the first application 30. The system hosting application control 44 may be configured to initialize the out of process webview control 42 with the instance of the webview process for the second application 34 that was launched by the system hosting application control 44.

The out of process webview control 42 may be configured to make calls to the webview process of the second application 34 that is out of process from the process of the first application 30 that includes the out of process webview control 42, and receive callbacks from the webview process to perform web related API functions. The out of process webview control 42 may include API functions that are recognized by the first application 30 that is configured for the user interface framework 32. Using the API functions exposed by the out of process webview control 42, the process for the first application 30 may interact with the out of process webview control 42 to route navigation controls 60 to the webview process of the second application 34. In one example, the navigation controls 60 are web application programming interfaces selected from the group consisting of navigation functions, script invoking functions, and navigation event callbacks. However, it will be appreciated that other types of web APIs may be routed as navigation controls 60 from the process of the first application 30 to the webview process of the second application 34.

In the manner described above, the process of the first application 30 may interact with and exchange rendering information with a webview process of the second application 34 that is built on an incompatible user interface framework by establishing the cross-process interface 12 including the out of process webview control 42 and the system hosting application control 44.

Figure 4:
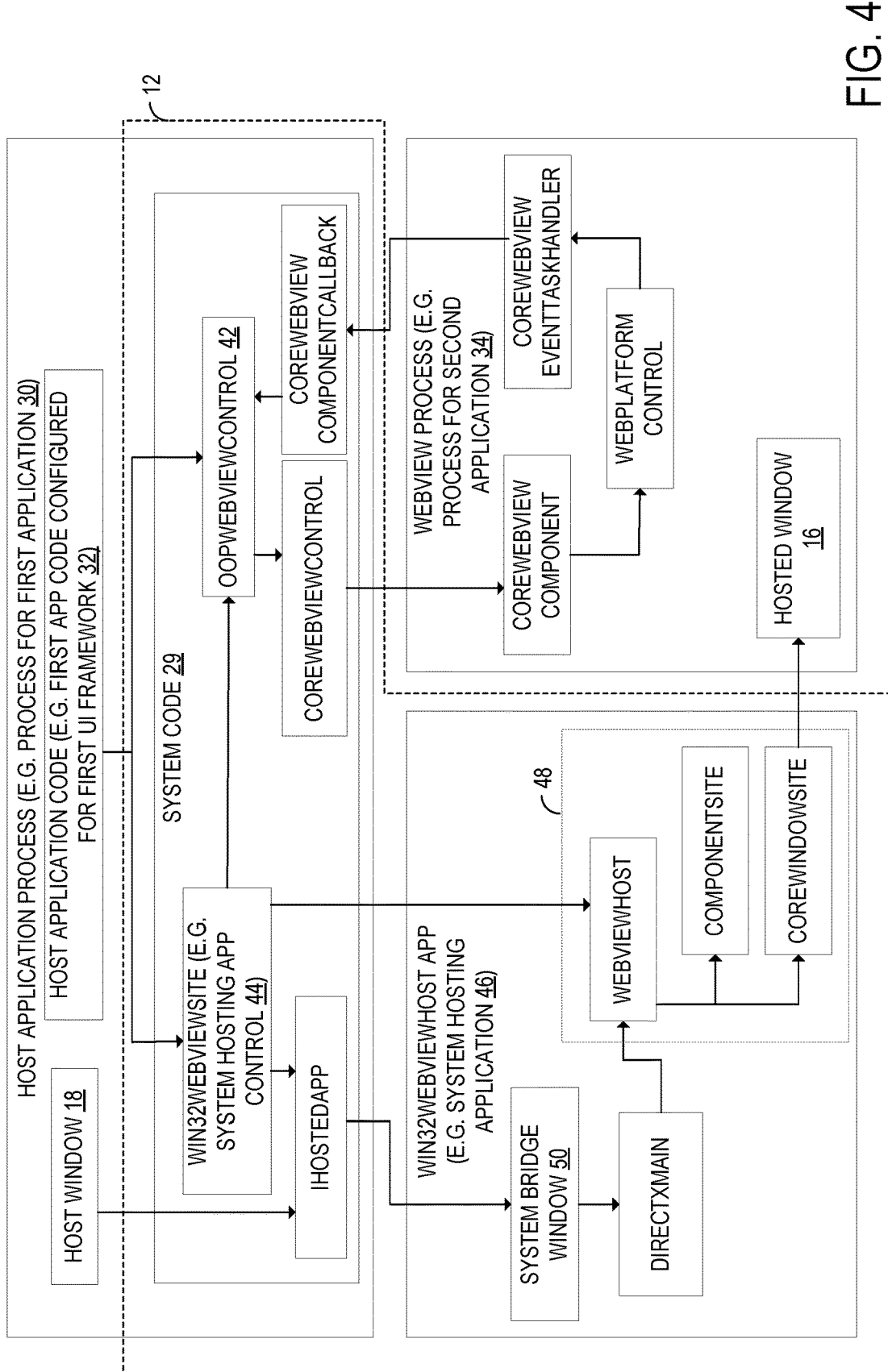
FIG. 4 shows a schematic view of an example computer architecture that implements the cross-process interface of FIG. 1.
Figure 5:
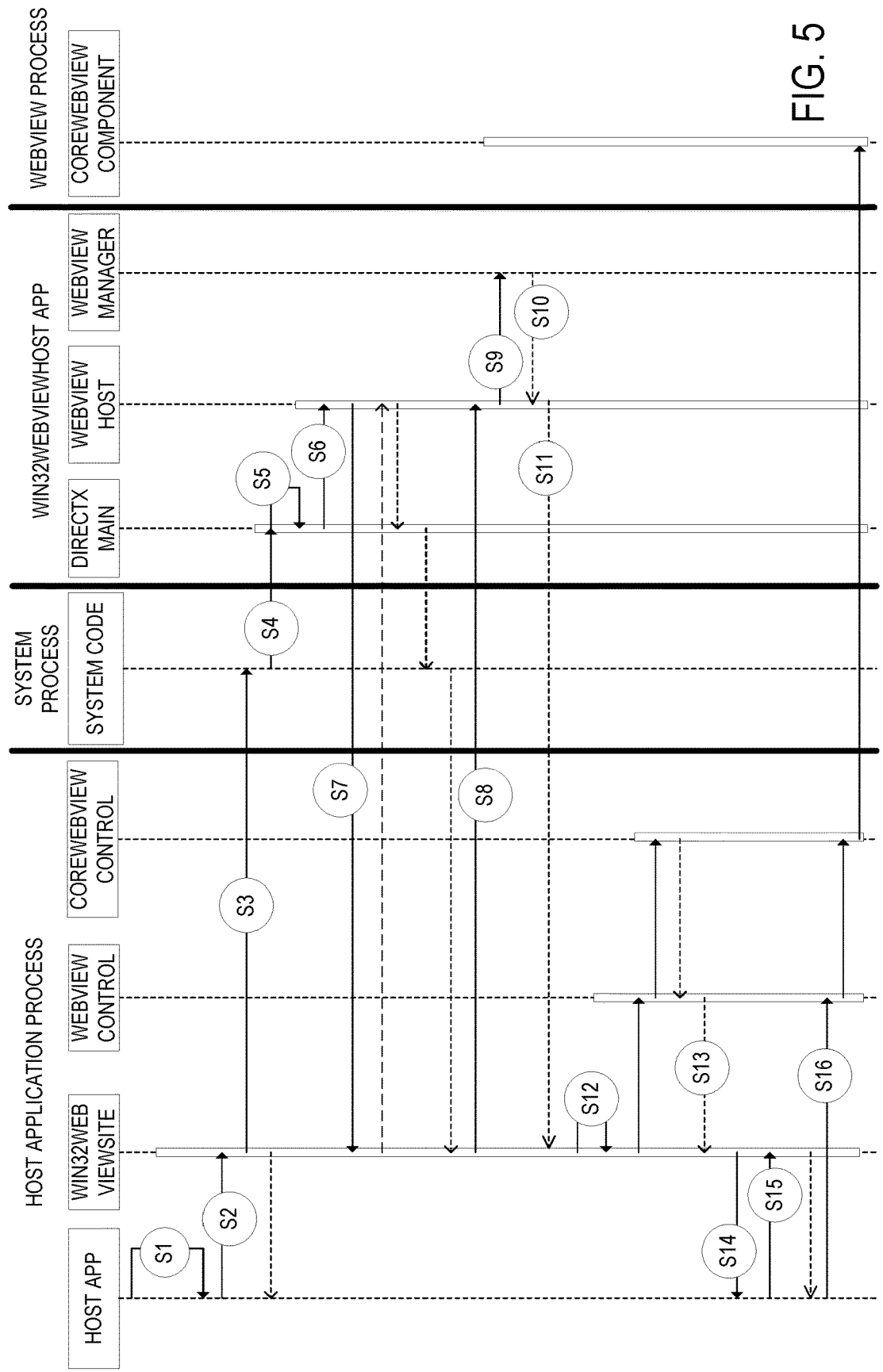
FIG. 5 shows a flowchart for a method of establishing a cross-process interface for the example computer architecture of FIG. 4.

FIGS. 4 and 5 illustrate a schematic view of a specific WINDOWS implementation of the cross-process interface 12. It will be appreciated that the broader concepts described in the specific implementation of FIG. 4 and FIG. 5 for establishing a cross-process interface 12 may also be applied to other frameworks, such as, for example, Java and C #, with modifications to suit the specific characteristics of those frameworks.

At (S1) the host application is configured to create a Win32WebViewSiteStatic, which is a static object that includes a function CreateWebViewAsync that is configured to start an async operation to create a WebView process.

At (S2) CreateWebViewAsync is configured to create an instance of a Win32WebViewSite runtime class (e.g. System hosting application control 44).

At (S3) the instance of the Win32WebViewSite is configured to launch a Win32WebViewHost App (e.g. system hosting application 46) and receive an instance of the Win32WebViewHost app as IHostedApp in FIG. 4. The instance of the Win32WebviewHost app may be interacted with by the host application process to manage the Win32WebViewHost app. The Win32WebViewHost application is a DirectX UWP application that is a system application that is on the computer device 10.

At (S4) the Win32WebViewHost App is activated by system code of the operating system.

At (S5) a DirectXMain object of the Win32WebViewHost App is configured to create a WebViewHost.

At (S6) the WebViewHost is initialized with a system bridge window 50 and an ActivatedEventArgs.

At (S7) the WebViewHost provides an instance of itself to the Win32WebViewSite through the ActivatedEventArgs.

After the Win32WebviewHost app is activated at (S4) and Win32WebViewSite has a proxy to the WebViewHost, at (S8) the Win32WebViewSite creates a CoreWebViewComponentCallback and calls CreateWebViewInRac on the proxy of the WebViewHost with the CoreWebViewComponentCallback.

At (S9) the WebViewHost calls into a WebViewManager to launch an Out of Process Webview process (e.g. process for the second application 34) with the CoreWebViewComponentCallback. The system bridge window 50 is attached (e.g. cross-process parenting 52) to a backing HWND of a hosted window 16 of the process for the second application 34.

At (S10) the WebViewManager returns a CoreWebViewComponent and the ComponentSite to the WebViewHost. The WebViewHost connects the ComponentSite to the system bridge window 50 of the Win32WebViewHost app.

At (S11) the WebViewHost returns the CoreWebViewComponent to the Win32WebViewSite.

At (S12) the Win32WebViewSite will create an instance of the OutofProcess WebViewControl 42 runtime class.

At (S13) the Win32WebViewSite will initialize the OutofProcess WebViewControl 42 with the CoreWebViewComponentCallback and CoreWebViewComponent. The OutofProcess WebViewControl 42 will make an instance of CoreWebViewControl with the CoreWebViewComponentCallback and the CoreWebViewComponent.

After (S1)-(S13) have been completed, the Win32WebViewHost app (e.g. system hosting application 46) and the out of process webview (e.g. process for second application) have been launched. At (S14) the Win32WebViewHost app is attached (e.g. cross-process parenting 52) to the backing HWND of the host window 18 of the host application process (e.g. process for first application 30) via a SetParentWindow call on the instance of the Win32WebViewHost app IHostedApp. After (S14) has been completed, Win32WebViewSite completes the async operation for CreateWebViewAsync started at (S1).

At (S15) the host application (e.g. process for the first application 30) retrieves the OutofProcess WebViewControl 42 from the Win32WebViewSite.

At (S16) the host application may call Navigate on the OutofProcess WebViewControl 42 to route navigation controls 60 to the Out of Process webview. For example, the Navigate call will be routed through the OutofProcess WebViewControl 42 and CoreWebViewControl in the host application process and is sent cross-process to CoreWebViewComponent in the Out of Process webview (e.g. process for the second application 34).

It will be appreciated that the architecture illustrated in FIG. 4 and the method (S1)-(S16) shown in FIG. 5 using the architecture of FIG. 4 are a specific example implementation for a Win32 to UWP cross-process interface 12. While the steps and architecture of FIGS. 4 and 5 are MICROSOFT specific, the described concepts may also be implemented for other incompatible framework scenarios, such as, for example, Java and C #. Further, implementations of the concepts described herein apply equally to other operating systems and programming frameworks, such as APPLE IOS and GOOGLE ANDROID environments.

Figure 6:
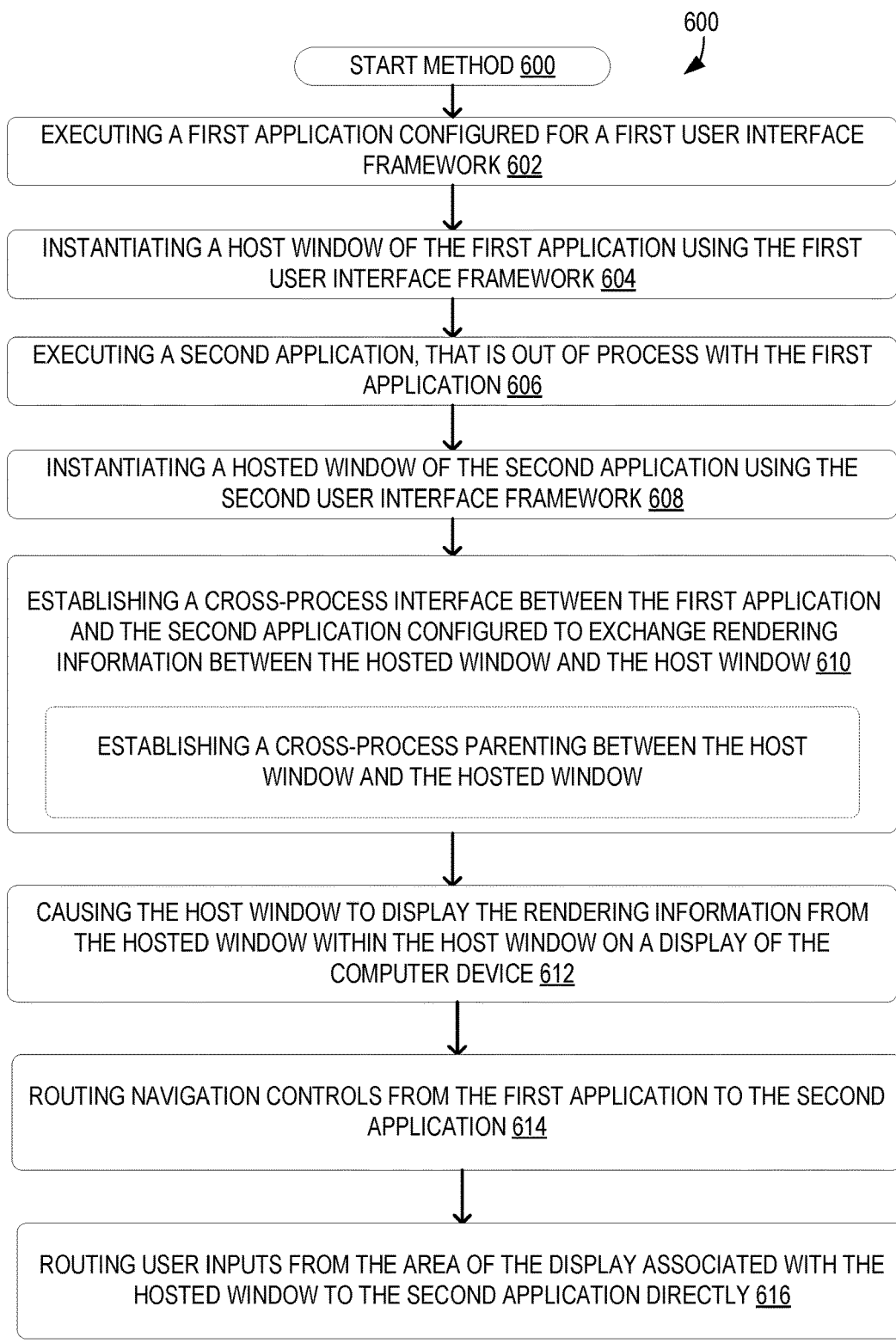
FIG. 6 shows a flowchart illustrating another method for establishing a cross-process interface for the computer device of FIG. 1.

FIG. 6 is a flowchart of a method 600 implemented by a computer device. Method 600 may be executed using the systems described above or utilizing other suitable hardware and software elements.

At 602, the method 600 may include executing a first application configured for a first user interface framework. In one example, the first application is built on Win32. A process for the first application 30 is illustrated in FIG. 2.

At 604, the method 600 may include instantiating a host window of the first application using the first user interface framework. In one example, the instance of the host window 18 includes a handle (e.g. HWND) to the host window 18 that is recognized within the first user framework 32. However, it will be appreciated that other platforms/frameworks may use other handles to manage their windows. An example instance of the host window 18 is illustrated in FIG. 2 and FIG. 3.

At 606, the method may include executing a second application, that is out of process with the first application, the second application configured for a second user interface framework that is incompatible with the first user interface framework. In one example, the second application is a web application that is built on UWP, which is incompatible with application built on Win32. In one specific example, the second user interface framework is incompatible with the first user interface framework by having no native control in the first user interface framework to host an application of the second user interface framework. That is, the first user interface framework 32 does not natively include a control, such as, for example, a webview controller/manager, that is configured to launch and manage a webview for an application configured for the second user interface framework 36 to present rendering information 14 and other functionality (e.g. user interface) of the second application 34 within the first application 30.

As another specific example, of incompatible frameworks, the first user interface framework is based on a first programming language and the second user interface framework is based on a second programming language, the first programming language being incompatible with the second programming language. For example, the first application 30 may be configured for a user interface framework built on Java and the second application may be configured for a user interface framework built on C #, which are incompatible programming languages. However, it will be appreciated that the first and second programming languages may take the form of any suitable pair of incompatible programming languages.

At 608, the method 600 may include instantiating a hosted window of the second application using the second user interface framework. Similarly to the host window, the hosted window may include a handle (e.g. HWND) to the hosted window 16.

At 610, the method 600 may include establishing a cross-process interface between the first application and the second application configured to exchange rendering information between the hosted window and the host window. In one example, establishing the cross-process interface includes establishing a cross-process parenting between the host window and the hosted window. For example, the cross-process interface may include a system bridge window that is controlled by an operating system of the computer device. Next, the host window may be established as a parent of the system bridge window, the system bridge window may be established as a parent of the hosted window. In this manner, the host window may be established as a parent of the hosted window through the system bridge window in a cross-process parenting relationship.

At 612, the method 600 may include causing the host window to display the rendering information from the hosted window within the host window on a display of the computer device. FIG. 3 illustrates an example of a first application window 54 of the process of the first application 30 being displayed on a display 20 of the computer device 10. The first application window 54 includes first application rendering information 56 that is rendered according to code of the first application 30. Alongside the first application rendering information 56, the host window 18 displays second application rendering information 14 from the hosted window 16 via the cross-process interface established at step 610. In this manner, rendering information from both the first application and the second application are presented via the display 20 in a unified view.

In one example, the cross-process interface further includes an out of process webview control. In this example, at 614, the method 600 may include routing navigation controls from the first application to the second application. In one example, the navigation controls are web application programming interfaces selected from the group consisting of navigation functions, script invoking functions, and navigation event callbacks. The out of process webview control 42 may be included in system code 29 being executed within the process of the first application 30.

At 616, the method 600 may include routing user inputs from the area of the display associated with the hosted window to the second application directly. FIG. 3 illustrates an example of a system input handler 58 routing user inputs based on a location of the user input on the display compared to the known positions and sizes of the host window 18 and its child hosted window 16. The user inputs may be routed directly to the process for the second application without passing through the process for the first application if the user input is detected as being directed to the area of the host/hosted window.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
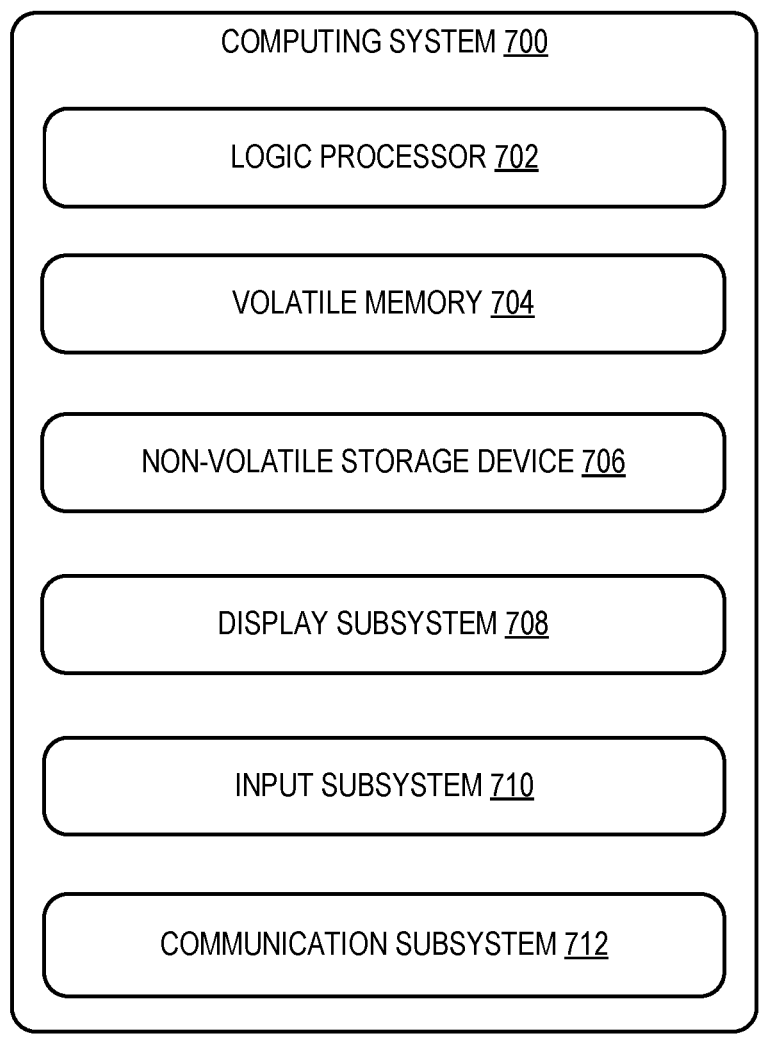
FIG. 7 shows a schematic view of an example computing environment in which the computer device of FIG. 1 may be enacted.

FIG. 7 schematically shows a non-limiting embodiment of a computing system 700 that can enact one or more of the methods and processes described above. Computing system 700 is shown in simplified form. Computing system 700 may embody the computer device 10 described above and illustrated in FIG. 2. Computing system 700 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 700 includes a logic processor 702 volatile memory 704, and a non-volatile storage device 706. Computing system 700 may optionally include a display subsystem 708, input subsystem 710, communication subsystem 712, and/or other components not shown in FIG. 7.

Logic processor 702 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 702 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 706 includes one or more physical devices configured to hold instructions executable by the logic processors to implement the methods and processes described herein. When such methods and processes are implemented, the state of non-volatile storage device 704 may be transformed—e.g., to hold different data.

Non-volatile storage device 706 may include physical devices that are removable and/or built-in. Non-volatile storage device 704 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 706 may include nonvolatile, dynamic, static, read/write, read-only, sequential-access, location-addressable, file-addressable, and/or content-addressable devices. It will be appreciated that non-volatile storage device 706 is configured to hold instructions even when power is cut to the non-volatile storage device 706.

Volatile memory 704 may include physical devices that include random access memory. Volatile memory 704 is typically utilized by logic processor 702 to temporarily store information during processing of software instructions. It will be appreciated that volatile memory 704 typically does not continue to store instructions when power is cut to the volatile memory 704.

Aspects of logic processor 702, volatile memory 704, and non-volatile storage device 706 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 700 typically implemented in software by a processor to perform a particular function using portions of volatile memory, which function involves transformative processing that specially configures the processor to perform the function. Thus, a module, program, or engine may be instantiated via logic processor 702 executing instructions held by non-volatile storage device 706, using portions of volatile memory 704. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 708 may be used to present a visual representation of data held by non-volatile storage device 706. The visual representation may take the form of a graphical user interface (GUI). As the herein described methods and processes change the data held by the non-volatile storage device, and thus transform the state of the non-volatile storage device, the state of display subsystem 708 may likewise be transformed to visually represent changes in the underlying data. Display subsystem 708 may include one or more display devices utilizing virtually any type of technology. Such display devices may be combined with logic processor 702, volatile memory 704, and/or non-volatile storage device 706 in a shared enclosure, or such display devices may be peripheral display devices.

When included, input subsystem 710 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 712 may be configured to communicatively couple various computing devices described herein with each other, and with other devices. Communication subsystem 712 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 700 to send and/or receive messages to and/or from other devices via a network such as the Internet.

The following paragraphs provide additional support for the claims of the subject application. One aspect provides a computer device comprising a processor configured to execute a first application configured for a first user interface framework, instantiate a host window of the first application using the first user interface framework, and execute a second application, that is out of process with the first application, the second application configured for a second user interface framework that is incompatible with the first user interface framework. In this aspect, the processor is further configured to instantiate a hosted window of the second application using the second user interface framework, establish a cross-process interface between the first application and the second application configured to exchange rendering information between the hosted window and the host window, and cause the host window to display the rendering information from the hosted window within the host window on a display of the computer device. In this aspect, additionally or alternatively, the cross-process interface may include an out of process webview control configured to route navigation controls from the first application to the second application. In this aspect, additionally or alternatively, the navigation controls may be web application programming interfaces selected from the group consisting of navigation functions, script invoking functions, and navigation event callbacks. In this aspect, additionally or alternatively, the processor may be further configured to route user inputs from the area of the display associated with the hosted window to the second application directly. In this aspect, additionally or alternatively, the second user interface framework may be incompatible with the first user interface framework by having no native control in the first user interface framework to host an application of the second user interface framework. In this aspect, additionally or alternatively, the first user interface framework may be based on a first programming language and the second user interface framework may be based on a second programming language, the first programming language being incompatible with the second programming language. In this aspect, additionally or alternatively, to establish the cross-process interface, the processor may be configured to establish a cross-process parenting between the host window and the hosted window. In this aspect, additionally or alternatively, to establish the cross-process parenting, the host window may be established as a parent of a bridge window and the bridge window may be established as a parent of the hosted window, wherein the bridge window may be controlled by a system process of an operating system executed by the processor. In this aspect, additionally or alternatively, the first application may be a stand-alone executable and the second application may be an add-in. In this aspect, additionally or alternatively, the first user interface framework may be WIN32, and the second user interface framework may be UNIVERSAL WINDOWS PLATFORM.

Another aspect provides a method comprising, at a computer device including a processor, executing a first application configured for a first user interface framework, instantiating a host window of the first application using the first user interface framework, and executing a second application, that is out of process with the first application, the second application configured for a second user interface framework that is incompatible with the first user interface framework. In this aspect, the method further comprises instantiating a hosted window of the second application using the second user interface framework, establishing a cross-process interface between the first application and the second application configured to exchange rendering information between the hosted window and the host window, and causing the host window to display the rendering information from the hosted window within the host window on a display of the computer device. In this aspect, additionally or alternatively, the cross-process interface may include an out of process webview control configured for routing navigation controls from the first application to the second application. In this aspect, additionally or alternatively, the navigation controls may be web application programming interfaces selected from the group consisting of navigation functions, script invoking functions, and navigation event callbacks. In this aspect, additionally or alternatively, the method may further comprise routing user inputs from the area of the display associated with the hosted window to the second application directly. In this aspect, additionally or alternatively, the second user interface framework may be incompatible with the first user interface framework by having no native control in the first user interface framework to host an application of the second user interface framework. In this aspect, additionally or alternatively, the first user interface framework may be based on a first programming language and the second user interface framework may be based on a second programming language, the first programming language being incompatible with the second programming language. In this aspect, additionally or alternatively, establishing the cross-process interface may include establishing a cross-process parenting between the host window and the hosted window. In this aspect, additionally or alternatively, establishing the cross-process parenting may include establishing the host window as a parent of a bridge window and establishing the bridge window as a parent of the hosted window, wherein the bridge window may be controlled by a system process of an operating system executed by the processor. In this aspect, additionally or alternatively, the first user interface framework may be WIN32, and the second user interface framework may be UNIVERSAL WINDOWS PLATFORM.

Another aspect provides a computer device comprising a processor configured to execute a first application configured for a first user interface framework, instantiate a host window of the first application using the first user interface framework, and execute a system hosting application that is configured to launch an out of process webview for a second application, the second application being configured for a second user interface framework that is incompatible with the first user interface framework. In this aspect, the processor is further configured to instantiate a system bridge window of the system hosting application, instantiate a hosted window of the second application using the second user interface framework, establish a cross-process interface between a process of the first application and the out of process webview for the second application by establishing a cross-process parenting between the host window, the system bridge window, and the hosted window that is configured to exchange rendering information between the hosted window and the host window, and cause the host window to display the rendering information from the hosted window within the host window on a display of the computer device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer device comprising:
a processor configured to:
execute an operating system at the computer device;
execute a first application within the operating system executed by the processor of the computer device, the first application configured for a first user interface framework;
instantiate a host window of the first application using the first user interface framework;
execute a second application within the operating system executed by the processor of the computer device that is out of process with the first application, the second application configured for a second user interface framework that is incompatible with the first user interface framework, wherein the first user interface framework and the second user interface framework are incompatible at least by including incompatible controls for hosting out of process applications;
instantiate a hosted window of the second application using the second user interface framework;
establish a cross-process interface as a system process of the operating system configured to exchange communications including rendering information between the hosted window of the second application being run in a first process of the operating system and the host window of the first application being run in a second process of the operating system that is out of process with the first process; and
display the rendering information rendered by the second application and exchanged from the hosted window to the host window by the cross-process interface within the host window on a display of the computer device.

2. The computer device of claim 1, wherein the cross-process interface includes an out of process webview control configured to route navigation controls from the first application to the second application.

3. The computer device of claim 2, wherein the navigation controls are web application programming interfaces selected from the group consisting of navigation functions, script invoking functions, and navigation event callbacks.

4. The computer device of claim 1, wherein the processor is further configured to route user inputs from the area of the display associated with the hosted window to the second application directly.

5. The computer device of claim 1, wherein the second user interface framework is incompatible with the first user interface framework by having no native control in the first user interface framework to host an application of the second user interface framework.

6. The computer device of claim 1, wherein the first user interface framework is based on a first programming language and the second user interface framework is based on a second programming language, the first programming language being incompatible with the second programming language.

7. The computer device of claim 1, wherein to establish the cross-process interface, the processor is configured to establish a cross-process parenting between the host window and the hosted window.

8. The computer device of claim 7, wherein to establish the cross-process parenting, the host window is established as a parent of a bridge window and the bridge window is established as a parent of the hosted window, wherein the bridge window is controlled by the system process of the operating system executed by the processor.

9. The computer device of claim 1, wherein the first application is a stand-alone executable and the second application is an add-in.

10. The computer device of claim 1, wherein the first user interface framework is WIN32, and the second user interface framework is UNIVERSAL WINDOWS PLATFORM.

11. A method comprising:
at a computer device including a processor:
executing an operating system at the computer device;
executing a first application within the operating system executed by the processor of the computer device, the first application configured for a first user interface framework;
instantiating a host window of the first application using the first user interface framework;
executing a second application within the operating system executed by the processor of the computer device that is out of process with the first application, the second application configured for a second user interface framework that is incompatible with the first user interface framework, wherein the first user interface framework and the second user interface framework are incompatible at least by including incompatible controls for hosting out of process applications;
instantiating a hosted window of the second application using the second user interface framework;
establishing a cross-process interface as a system process of the operating system configured to exchange communications include rendering information between the hosted window of the second application being run in a first process of the operating system and the host window of the first application being run in a second process of the operating system that is out of process with the first process; and
display the rendering information rendered by the second application and exchanged from the hosted window to the host window by the cross-process interface within the host window on a display of the computer device.

12. The method of claim 11, wherein the cross-process interface includes an out of process webview control configured for routing navigation controls from the first application to the second application.

13. The method of claim 12, wherein the navigation controls are web application programming interfaces selected from the group consisting of navigation functions, script invoking functions, and navigation event callbacks.

14. The method of claim 11, the method further comprises routing user inputs from the area of the display associated with the hosted window to the second application directly.

15. The method of claim 11, wherein the second user interface framework is incompatible with the first user interface framework by having no native control in the first user interface framework to host an application of the second user interface framework.

16. The method of claim 11, wherein the first user interface framework is based on a first programming language and the second user interface framework is based on a second programming language, the first programming language being incompatible with the second programming language.

17. The method of claim 11, wherein establishing the cross-process interface incudes establishing a cross-process parenting between the host window and the hosted window.

18. The method of claim 17, wherein establishing the cross-process parenting includes establishing the host window as a parent of a bridge window and establishing the bridge window as a parent of the hosted window, wherein the bridge window is controlled by the system process of the operating system executed by the processor.

19. The method of claim 11, wherein the first user interface framework is WIN32, and the second user interface framework is UNIVERSAL WINDOWS PLATFORM.

20. A computer device comprising:
a processor configured to:
execute a first application configured for a first user interface framework;
instantiate a host window of the first application using the first user interface framework;
execute a system hosting application that is configured to launch an out of process webview for a second application, the second application being configured for a second user interface framework that is incompatible with the first user interface framework;
instantiate a system bridge window of the system hosting application;
instantiate a hosted window of the second application using the second user interface framework;
establish a cross-process interface between a process of the first application and the out of process webview for the second application by establishing a cross-process parenting between the host window, the system bridge window, and the hosted window that is configured to exchange rendering information between the hosted window and the host window; and
cause the host window to display the rendering information from the hosted window within the host window on a display of the computer device.

* * * * *